Dec. 30, 1969   L. S. GASIOREK ET AL   3,487,282
CONTROL SYSTEM FOR AN ELECTRIC MOTOR
Filed May 3, 1967   2 Sheets-Sheet 1

LEONARD S. GASIOREK
FREDERIC L. ZEISLER
INVENTORS

BY John R. Faulkner
   Glenn S. Arendsen
   ATTORNEYS

United States Patent Office 3,487,282
Patented Dec. 30, 1969

3,487,282
CONTROL SYSTEM FOR AN ELECTRIC MOTOR
Leonard S. Gasiorek, Stanford, Calif., and Frederic L. Zeisler, Livonia, Mich., assignors to Ford Motor Company, Dearborn, Mich., a corporation of Delaware
Filed May 3, 1967, Ser. No. 635,915
Int. Cl. H02p 1/04
U.S. Cl. 318—443                    10 Claims

ABSTRACT OF THE DISCLOSURE

This control system provides intermittent operation of a windshield wiper motor in which the dwell period varies automatically with the load on the motor and can be varied manually. The system also provides continuous operation of the motor in which the continuous speed can be varied manually. A trigger circuit directs the operation of an electronic power switch that in turn controls the current through a load resistor and the windshield wiper motor. The automatically variable dwell period is established by a transistor connected across the load resistor to conduct current to a capacitor while the motor is running with motor current exceeding a certain value. When the motor reaches its park position the capacitor is connected to the trigger to turn off the power switch for a time period proportional to the charge on the capacitor. After the charge is dissipated, the trigger turns on the power switch and the motor then completes another wiping cycle. A manually variable resistor controls the discharge rate of the capacitor, thereby providing manual control over the dwell period.

Manual variation of the continuous motor operation is established by a variable frequency unijunction oscillator. The frequency of oscillation is varied by applying various portions of the supply voltage from base 2 to base 1 of the unijunction transistor. While the unijunction transistor is off, the rising voltage at its emitter is applied to the trigger, thereby keeping the power stage on for a portion of the time and off for the remaining portion. When the unijunction transistor turns on, the emitter voltage is discharged, the trigger turns the power stage on, and the cycle is repeated.

SUMMARY OF THE INVENTION

Electric windshield wipers having variable continuous speeds have been used in the automobile industry for several years. Because such wipers could not be slowed sufficiently to wipe the windshield clear of light rain or mist without chattering or excessive wear, wipers capable of intermittent operation in which the wiper motor entered a dwell period after each wiping cycle were produced. A single continuous speed usually was added to the intermittently operating wipers to take care of heavier weather, but no satisfactory means producing both automatically variable dwell periods during intermittent operation and manually variable speeds during continuous operation had been devised.

Intermittent operation was produced by incorporating bimetal switches into the circuit in a manner such that the bimetals responded to the current through the motor to increase dwell time when motor current was high and decrease dwell time when motor current was low. Since the motor current is high for a relatively dry windshield, this automatically adjusted the dwell time to the windshield condition.

This invention provides a control system for an electric motor that provides intermittent operation of the motor with the dwell period following each portion of motor operation being proportional to the current through the motor during the previous portion of operation and also provides variable speed, continuous motor operation. Intermittent operation with the automatically variable dwell period is provided by circuitry charging and discharging a capacitor. Much longer life and less sensitivity to manufacturing tolerances are immediate benefits of this capacitor system. The control system has a source of electric energy and an electronic power switch for coupling and uncoupling the source of electrical energy to the windshield wiper motor. A trigger coupled to the power switch directs the operation thereof. The capacitor is coupled into the system so it charges to a value depending on the current drawn by the motor while the motor is running. When the motor moves into its park position, circuitry couples the capacitor to the input of the trigger which then holds the power switch off for a period of time depending on the time required to dissipate the charge on the capacitor. When the charge has been dissipated, the trigger turns on the power switch and another wiping cycle begins.

A convenient system for charging the capacitor in proportion to the current drawn by the motor includes connecting a load resistor in series with the motor and using that load resistor to forward bias a transistor connected in series with the capacitor. A set of contacts actuated by the motor couples the transistor to the capacitor while the motor is running and couples the capacitor to the trigger input when the motor moves into its park position. A manually variable potentiometer establishes the discharge rate of the capacitor to provide manual control over the dwell period.

The circuit producing variable continuous operation of the motor uses a manually variable potentiometer to apply a portion of the supply voltage across the bases of a unijunction transistor. A capacitor connected to the transistor emitter charges when the unijunction transistor is off and discharges through the unijunction transistor when the transistor turns on. Motor speed is a function of the average voltage across the motor and varying the oscillation frequency of the unijunction oscillator varies the average voltage supplied to the motor.

DETAILED DESCRIPTION

Figure 1:
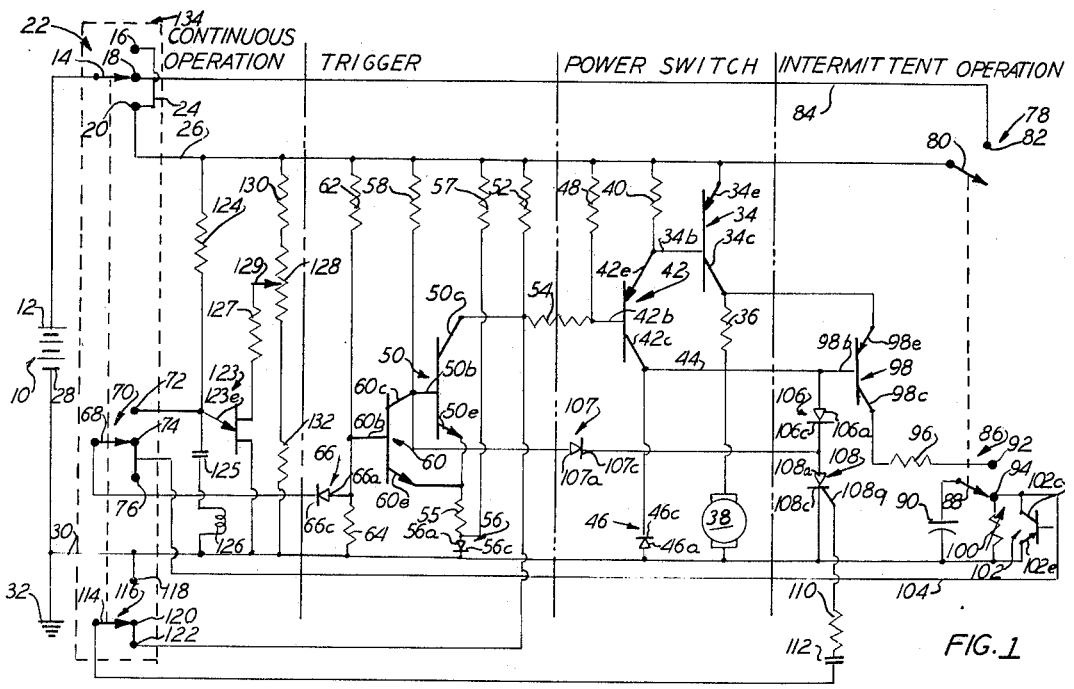
FIGURE 1 is a schematic diagram of the control system provided by this invention in which the various sections of the circuit are partitioned by dashed vertical lines. The FIGURE 1 circuit requires the motor gear box to operate two single pole switches and also requires two independent potentiometers for manually varying the dwell time during intermittent operation and the speed during constant operation respectively.

Construction of the FIGURE 1 circuit

Referring to FIGURE 1, a battery, the source of electrical energy, is indicated generally by the numeral 10. Battery 10 has a positive terminal 12 connected to a pole 14 of a single pole, three position switch indicated generally by the numeral 22. Pole 14 is movable to each of three contacts 16, 18 and 20 of switch 22. Contacts 16 and 20 are connected to each other by a lead 24 and to a positive buss lead 26. The negative terminal 28 of battery 10 is connected to a negative buss lead 30 and to ground at 32.

Buss leads 26 and 30 pass horizontally through the four sections of the circuit labeled continuous operation, trigger, power switch, and intermittent operation. Starting with the power switch section, a PNP transistor 34 has its emitter 34e connected to buss lead 26 and its collector 34c connected through a load resistor 36 to the input of the wiper motor 38. The output of motor 38 is connected to negative buss lead 30. Base 34b of transistor 34 is connected through a resistor 40 to buss lead 26 and also is connected to the emitter 42e of a second PNP transistor 42.

Collector 42c of transistor 42 is connected through a lead 44 to the input of motor 38 and also is connected to the cathode 46c of a diode 46. The anode 46a of diode 46 is connected to buss lead 30. Base 42b of transistor 42 is connected through a resistor 48 to buss lead 26.

Turning now to the trigger, an NPN transistor 50 has its collector 50c connected through a resistor 52 to buss lead 26. A coupling resistor 54 connects collector 50c with base 42b. Emitter 50e of transistor 50 is connected through a resistor 55 to the anode 56a of a diode 56 having its cathode 56c connected to buss lead 30. Anode 56a is connected through a resistor 57 to buss lead 26.

Base 50b of transistor 50 is connected through a resistor 58 to buss lead 26 and also is connected to the collector 60c of an NPN transistor 60. Emitter 60e is connected to emitter 50e. Base 60b is connected through a resistor 62 to buss lead 26 and through a resistor 64 to buss lead 30. A trigger input diode 66 has its anode 66a connected to base 60b and its cathode 66c connected to the pole 68 of a second single pole three position switch indicated generally by the numeral 70 and having contacts 72, 74 and 76.

The trigger and power switch sections operate in the following manner. With positive buss lead 26 connected to positive terminal 12 of battery 10, applying a potential below a predetermined value to cathode 66c turns off transistor 60 and turns on transistor 50, which in turn turns on transistors 42 and 34. Current then flows through motor 38 and motor 38 operates the windshield wipers through conventional linkage. Applying a potential above the predetermined value to cathode 66c turns on transistor 60 and turns off transistors 50, 42 and 34, thereby stopping the current through motor 38. Some hysteresis can exist in the trigger so that a rising potential at cathode 66c turns on transistor 60 at a value a few volts above that at which a falling potential turns off transistor 60.

In the intermittent section, a parking switch indicated generally by the numeral 78 is located in the motor gear box where its pole 80 is actuated by a cam (not shown) connected to the motor. Pole 80 is connected to buss lead 26 and moves into touch with a contact 82 when motor 38 is running. Contact 82 is connected by a lead 84 to contact 18 in switch 22. When motor 38 moves the windshield wipers into a parking position, pole 80 moves out of touch with contact 82 to a neutral position.

A second switch 86 has its pole 88 ganged for operation with pole 80. Pole 88 is connected through a capacitor 90 to buss lead 30. When motor 38 is running, pole 88 is in touch with a contact 92, and when motor 38 moves into the park position pole 88 is in touch with a contact 94.

A resistor 96 connects contact 92 with the collector 98c of a PNP transistor 98. Emitter 98e of transistor 98 is connected to collector 34c of transistor 34 and base 98b is connected directly to collector 42c and through resistor 36 to collector 34c so resistor 36 serves as a biasing resistor for transistor 98.

Contact 94 of switch 86 is connected through a variable resistor 100 to buss lead 30 and to the collector 102c of a transistor 102 having its emitter 102e connected to buss lead 30. The base of transistor 102 is unconnected. In addition, a lead 104 connects contact 94 with contacts 74 and 76 of switch 70.

A diode 106 has its anode 106a connected to base 98b and its cathode 106c connected to the anode 108a of a thyristor 108. A diode 107 has its cathode 107c connected to cathode 106c and its anode 107a connected to base 50b of transistor 50. The cathode 108c of thyristor 108 is connected to buss lead 30 and its gate 108g is connected through a resistor 110 and a capacitor 112 to the pole 114 of a third single pole three position switch 116. Pole 114 is movable to contacts 118, 120 and 122 and is ganged for operation with poles 68 and 14. Contact 118 is connected to buss lead 30 and contacts 120 and 122 are connected together and to collector 50c of transistor 50.

The circuitry providing the continuous operation of motor 38 comprises a unijunction transistor 123 having its emitter 123e connected to contact 72 of switch 70. A resistor 124 connects emitter 123e with buss lead 26, and a capacitor 125 in series with an inductor 126 connects emitter 123e to buss lead 30. Base one of transistor 123 is connected to buss lead 30 and base two is connected through a resistor 127 to a tap 129 on a variable resistor 128. Variable resistor 128 is connected through a resistor 130 to buss lead 26 and through a resistor 132 to buss lead 30.

With battery 10 producing about 12 volts, typical values of the components of the FIGURE 1 circuit are: transistor 34, Delco DTG 2100; resistor 36, 0.072 ohm; resistor 40, 15 ohms; transistor 42, 2N301; diode 46, 1N2071; resistor 48, 47 ohms; transistor 50, 2N3569; resistor 52, 2.2K ohms; resistor 54, 150 ohms and 2 watts; diode 56, 1N4009; resistor 57, 2.2K ohms; resistor 58, 4.7K ohms; transistor 60, 2N2924; resistor 62, 82K ohms; resistor 64, 47K ohms; diode 66, 1N4009; capacitor 90, 500 microfarads; resistor 96, 100 ohms; transistor 98, 2N1384; resistor 100, variable to 10K ohms; transistor 102, 2N301; diode 106, 1N4005; diode 107, 1N91; thyristor 108, C22U; resistor 110, 150 ohms; capacitor 112, 2 microfarads; transistor 123, 2N2646; resistor 124, 150K ohms; capacitor 125, 0.05 microfarad; inductor 126, 1 millihenry; resistor 127, 330 ohms; resistor 128, variable to 10K ohms; resistor 130, 3.9K ohms; and resistor 132, 56K ohms.

Operation of the FIGURE 1 circuit

Switches 22, 70 and 116 are mounted in a master control housing indicated by dashed line 134 that is accessible to 10K ohms; resistor 130, 3.9K ohms; and resistor contact 16, pole 68 is in touch with contact 72 and pole 114 is in touch with contact 118. Similarly, when pole 14 is in touch with contact 18, pole 68 is in touch with contact 74 and pole 114 is in touch with contact 120, and when pole 14 is in touch with contact 20, pole 68 is in touch with contact 76 and pole 114 is in touch with contact 122. Variable resistors 100 and 128 also are accessible to the vehicle driver and can be mounted in master control housing 134 if desired.

Intermittent operation of motor 38 is produced in the following manner. Pole 14 is moved into touch with contact 20, thereby moving poles 68 and 114 accordingly. There is no charge on capacitor 90 so no voltage is applied to cathode 66c, the input to the trigger, and transistor 60 turns off, thereby turning on transistors 50, 42 and 34. Transistors 34 and 42 conduct current from battery 10 to motor 38 and motor 38 begins a wiping cycle. The cam in the motor gear box moves poles 80 and 88 into touch with contacts 82 and 92, respectively.

The load current of motor 38 varies from about 1–1¾ amperes for a wet windshield to about 9 amperes for various dry windshields. Resistor 36 is selected so transistor 98 operates from just below cutoff for wet windshields through various degrees of conduction to full on for very dry windshields.

When the windshield is moderately damp, such as in a light mist, the voltage drop across resistor 36 forward biases transistor 98 which applies a charge through contact 92 and pole 88 to capacitor 90. As motor 38 moves into its park position, the charge on capacitor 90 is applied through pole 88, contact 94, lead 104, contact 76, and pole 68 to cathode 66c. If the charge is above the predetermined triggering voltage, it turns on transistor 60, thereby turning off transistors 50, 42 and 34 and holding motor 38 in the dwell stage. Motor 38 remains in the dwell stage until the charge on capacitor 90 dissipates. Transistor 102 dissipates the charge by a leakage current that is fairly constant over the voltage range encountered by capacitor 90 and resistor 100 provides a variable shunt across transistor 102 by which the driver can control the dissipation rate and thereby control the length of the dwell period.

As transistor 50 turns off in response to the application of the charge on capacitor 90 to cathode 66c, the voltage at collector 50c rises rapidly to supply voltage. This voltage is applied through contact 122, pole 114, capacitor 112 and resistor 110 to gate 108g of thyristor 108. Thyristor 108 switches into conduction, thereby dynamically braking motor 38 to prevent the inertia of the motor and the wiper mechanism from driving motor 38 through its park position. Thyristor 108 turns off shortly after the braking operation when the current through thyristor 108 drops below its holding current. Diodes 106 and 107 hold off the trigger section and the power transistors 34 and 42 whenever thyristor 108 is on to prevent spurious noise from acting through the trigger section to turn on power transistors 34 and 42 while thyristor 108 is conducting.

If the mist changes to rain, the resulting decrease in motor current and voltage drop across resistor 36 decreases the conduction of transistor 98 which in turn decreases the charge stored in capacitor 90 during the wiping cycle. The decreased charge dissipates more rapidly and thereby reduces the dwell period of motor 38. Similarly, if the mist decreases, the increasing voltage drop across resistor 36 increases conduction of transistor 98 and increases the charge on capacitor 90. The increased charge requires a longer time for dissipation and consequently motor 38 remains in its dwell stage for a longer time.

Assuming that the rain increases to the point where intermittent operation cannot clear the windshield adequately, the vehicle driver switches poles 14, 68, and 114 to contacts 16, 72 and 118, respectively. This disconnects the intermittent section from the trigger input and connects the continuous operation section to the input with the voltage at emitter 123 of unijunction transistor 123 being applied to cathode 66c.

The current through resistor 124 changes capacitor 125 until the voltage at emitter 123e reaches the peak point of transistor 123 and then drops when transistor 123 breaks into conduction. Transistor 123 then discharges capacitor 125 with inductor 126 driving emitter 123e slightly negative during the discharge. Transistor 123 then turns off and current begins charging capacitor 125 again to repeat the oscillation cycle. The peak point is a function of the voltage selected by tap 129 from variable resistor 128 and applied across the bases of transistor 123.

Pole 68 applies the voltage at emitter 123e to cathode 66c so the trigger section turns on motor 38 for a fixed time while capacitor 125 charges up to the predetermined trigger value and then turns off motor 38 while capacitor 125 continues charging up to the peak point. As the peak point is varied by variable resistor 128, the time required for the voltage on capacitor 125 to reach the peak point also varies. Motor speed depends on the average voltage applied to the motor so by manipulating variable resistor 128 the driver varies the speed of motor 38.

If the vehicle driver moves pole 14 to contact 18, the off position, while motor 38 is running, pole 80 applies battery voltage to buss lead 26 through switch 78 until motor 38 moves into its park position. This insures that the windshield wipers will not stop unless they are in the park position where the wipers do not obstruct the vision of the driver.

Figure 2:
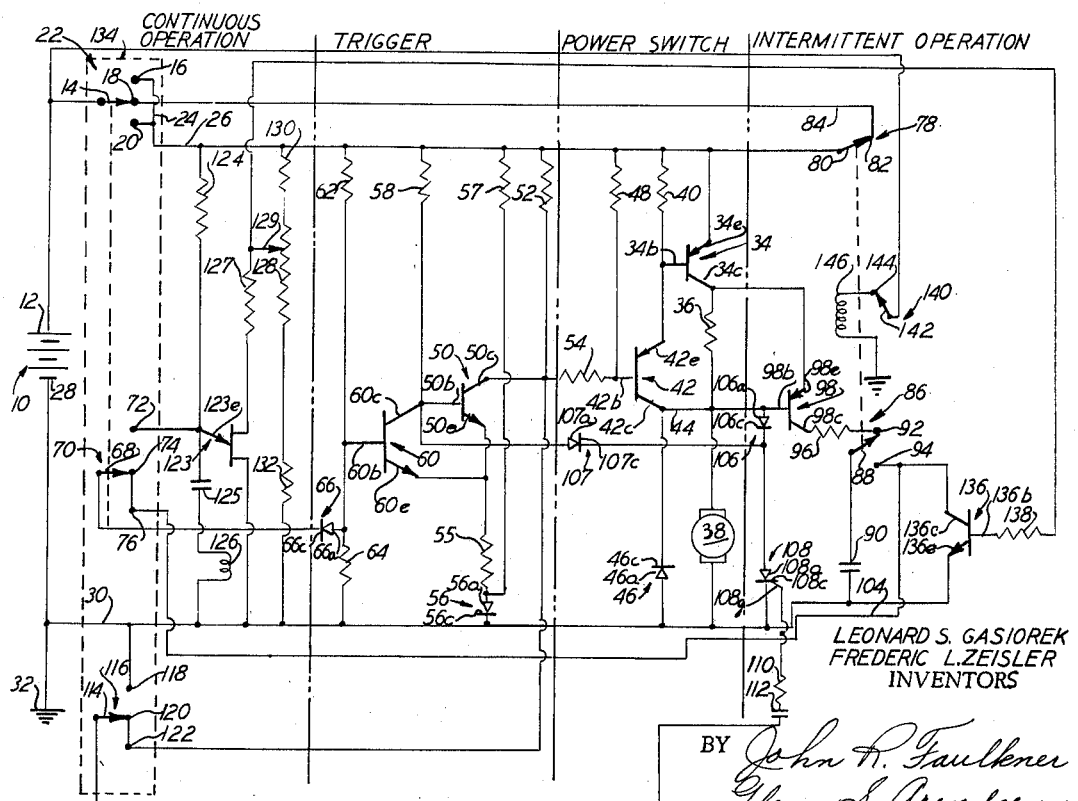
FIGURE 2 is a schematic diagram of the control system in which one switch in the motor gear box controls a relay that in turn operates the two switches. In addition, a single potentiometer provides both the manually variable dwell time during intermittent operation and the manually variable speed for continuous operation.

Construction and operation of the FIGURE 2 circuit

The FIGURE 2 circuit is identical to the FIGURE 1 circuit except where noted below. In the FIGURE 2 circuit, variable resistor 100 and transistor 102 are eliminated. An NPN transistor 136 has its collector 136c connected to contact 94 and its emitter 136e connected to buss lead 30. Base 136b is connected through a resistor 138 to the movable tap 129 on resistor 128. Typically, transistor 136 is a type 2N3053 and resistor 136 is 120K ohms.

Variable resistor 128 controls the forward bias of transistor 136 which in turn controls the discharge rate of capacitor 90 and thereby establishes the length of the dwell period during intermittent operation. In addition, variable resistor 128 establishes the speed during continuous operation as described in connection with FIGURE 1. Moving tap 129 toward the buss lead 26 end of resistor 128 increases the discharge rate of capacitor 90 during intermittent operation, thereby decreasing the dwell time. And with tap 129 at the buss lead 26 end of resistor 128, motor 38 has a minimum continuous speed. If the minimum dwell time is insufficient for weather conditions, the vehicle driver simply switches poles 14, 68 and 114 to contacts 16, 72 and 118, respectively, for continuous operation where he has the minimum continuous speed without adjusting the position of tap 129.

FIGURE 2 also permits moving switches 78 and 86 out of the motor gear box. A single switch 140 is located inside the gear box where its pole 142 is actuated by the cam connected to motor 38 as described above. Pole 142 is connected to the positive terminal 12 of battery 10 and is movable into touch with a contact 144 when motor 38 is running and out of touch with contact 144 when motor 38 moves into the park position. Contact 144 is connected to one side of a solenoid winding 146 that has its other side connected to ground. The solenoid operated by winding 146 moves poles 80 and 88 into touch with contacts 82 and 92 respectively, when a current exists in winding 146. A spring (not shown) moves pole 80 out of touch with contact 78 and moves pole 88 into touch with contact 94 when the current in winding 146 stops.

Figure 3:
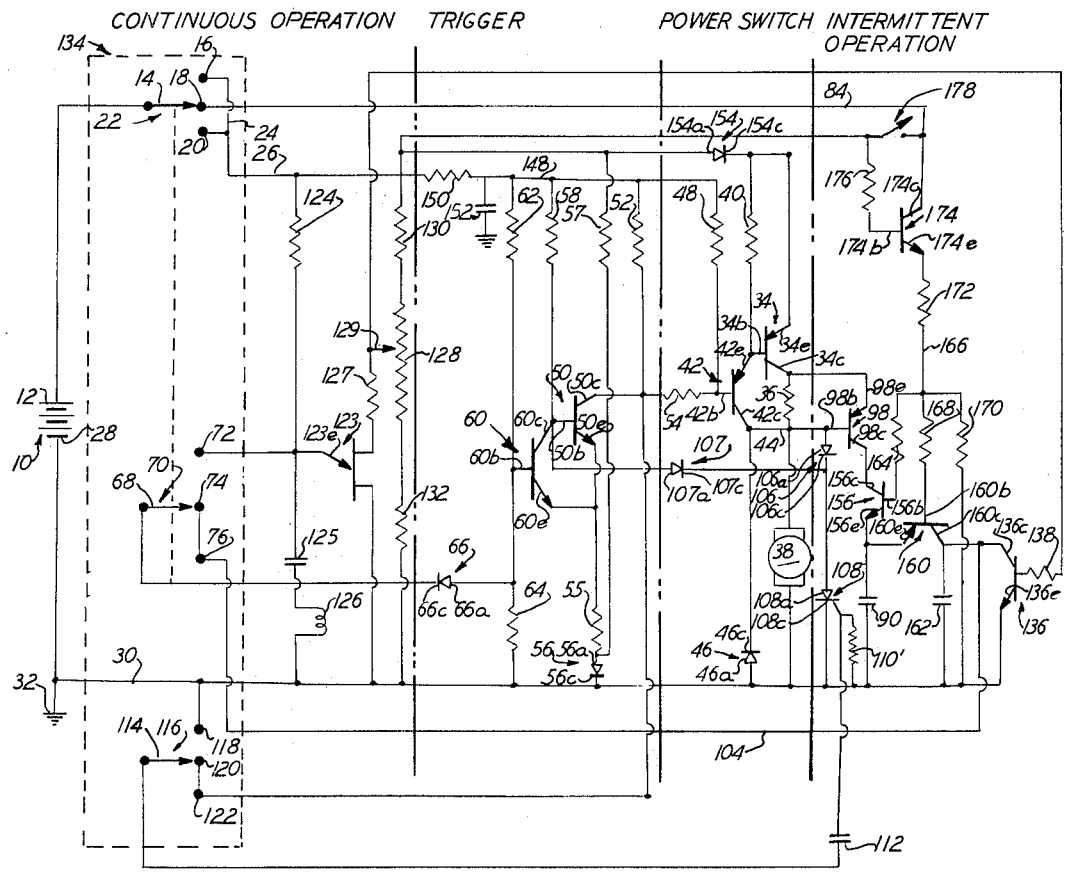
FIGURE 3 shows a schematic diagram in which the relays of FIGURE 2 are eliminated.

Construction and operation of the FIGURE 3 circuit

In FIGURE 3 only resistors 57, 124 and 130 are connected directly to buss lead 26. Resistors 48, 52, 58 and 62 are connected to a lead 148, and lead 148 is connected to buss lead 26 through a resistor 150. A capacitor 152 is connected between lead 148 and ground. A diode 154 has its anode 154a connected to buss lead 26 and its cathode 154c connected to resistor 40 and emitter 34e.

Collector 98c of transistor 98 is connected to the collector 156c of an NPN transistor 156 having its emitter 156e connected through capacitor 90 to buss lead 30 and also connected to the emitter 160e of a PNP transistor 160. Collector 160c is connected through a capacitor 162 to buss lead 30 and also is connected to lead 104 and collector 136c.

A resistor 164 connects base 156b with a lead 166 and a resistor 168 connects base 160b with lead 166. A resistor 170 connects lead 166 with buss lead 30 and a resistor 172 connects lead 166 with the emitter 174e of an NPN transistor 174. Collector 174c is connected by lead 84 to contact 18 of switch 22, and base 174b is connected through a resistor 176 to buss lead 26. A switch 178 connects buss lead 26 with collector 174c.

An alternate circuit for gate 108g of thyristor 108 also is shown in FIGURE 3 where gate 108g is connected through resistor 110' to buss lead 30 and is coupled to pole 114 through capacitor 112 only.

Typical values of the additional components of the FIGURE 3 circuit are: resistor 110', 2.2K ohms; resistor 150, 100 ohms; capacitor 152, 10 microfarads; diode 154, 1N1206A; transistor 156, 2N3391; transistor 160, 2N1307; capacitor 162, 50 microfarads; resistor 164, 27K ohms; resistor 168, 39K ohms; resistor 170, 5.6K ohms;

resistor 172, 1K ohm; transistor 174, 2N3391; and resistor 176, 120K ohms.

Switch 178 is operated by the cam in the gear box of motor 38 and the switch is closed when motor 38 is running and open when motor 38 is parked. When switch 178 is closed, transistor 174 turns on, thereby turning on transistor 156 and turning off transistor 160. Capacitor 90 receives a charge by virtue of a current flowing through transistor 98 and transistor 156 while motor 38 is running with a load sufficient to forward bias transistor 98. As motor 38 moves into its park position, switch 178 opens, thereby turning off transistors 174 and 156 and turning on transistor 160. The charge on capacitor 90 then is applied through transistor 160, lead 104 and pole 68 to cathode 66c. Intermittent operation thus occurs in the same manner as described above with reference to FIGURE 1 with transistor 136 serving as described with reference to FIGURE 2 to dissipate the charge on capacitor 90.

If pole 14 is moved into touch with contact 18, the off position, while motor 38 is running, closed switch 178 permits motor 38 to continue running until it reaches the park position. Switch 178 then opens to stop further operation of motor 38.

Diode 154 prevents the back EMF of motor 38 from reaching the trigger. Resistor 150 and capacitor 152 act as a filter to prevent the voltage drop occurring in buss lead 26 when motor 38 starts from gating thyristor 108 and also permits the trigger to remain on long enough to stop the motor in its park position.

Thus this invention provides a control system for an electric motor that charges a capacitor according to the current required by the motor to produce automatically variable intermittent operation of the motor. The control system also produces continuous operation of the motor and provides for manual variation of both types of operation by a single potentiometer. When used as a windshield wiper system, the disclosed control circuits vary the speed from over 65 cycles per minute to less than three cycles per minute, which, with minor changes can be expanded or contracted as desired.

What is claimed is:

1. In a control system for an electric motor having a source of electric energy and a switching means coupling and uncoupling said source and motor, the improvement comprising
    a trigger means coupled to said switching means for directing the operation thereof, said trigger means having a signal input means, said trigger means actuating the switching means to operate the motor when an input signal at the input means is above a predetermined value, said trigger means deactivating said switching means to prevent continued motor operation when the input signal is below a predetermined value,
    a capacitor,
    a motor operated switch having a running position and a dwell position, said switch coupling said capacitor to said motor when in the running position so that the charge on said capacitor is representative of the current through said motor during the running operation, and
    circuitry including means for dissipating the charge on said capacitor at varying rates, said circuitry coupling said capacitor to the input means of said trigger means when the motor operated switch is in the dwell position for holding the motor in the dwell position until the charge applied to the input means by said capacitor has dissipated below said predetermined value, said control system thus producing intermittent operation of the motor in which the dwell period varies automatically with the current drawn by the motor.

2. The control system of claim 1 comprising
    a resistor in series with the motor and the switching means, and
    a transistor in series with said capacitor, said transistor being reverse biased when current through said resistor is below a predetermined value and forward biased in proportion to the current above the predetermined value.

3. The control system of claim 2 comprising manually variable means for varying the rate at which said capacitor discharges.

4. The control system of claim 3 comprising circuit means for producing continuous operation of said motor, said circuit means comprising a unijunction oscillator including a unijunction transistor and a capacitor coupled to the emitter of said unijunction transistor, and a manual switch for coupling the voltage at the emitter of said unijunction transistor to said input means of said trigger means, said trigger means operating said motor continuously at a speed approximately proportional to the average voltage at the emitter of the unijunction transistor.

5. The control system of claim 4 in which a single potentiometer varies the rate at which said capacitor discharges to vary thereby the dwell period and varies the oscillation frequency of said unijunction transistor to vary thereby the speed of the motor during continuous operation.

6. The control system of claim 1 comprising circuit means for producing continuous operation of the motor, said circuit means comprising a unijunction oscillator including a unijunction transistor and a capacitor coupled to the emitter of said unijunction transistor, and a manual switch for coupling the voltage at the emitter of said unijunction transistor to said input means of said trigger means, said trigger means operating said motor continuously at a speed approximately proportional to the average voltage at the emitter of the unijunction transistor.

7. The control system of claim 6 comprising manually variable means for varying the dwell period of the motor during intermittent operation and the speed of the motor during continuous operation.

8. In a control system for an electric windshield wiper motor having a source of electric energy and a switching means coupling and uncoupling said source and motor, the improvement comprising
    a trigger means coupled to said switching means for directing the operation thereof, said trigger means having a signal input means, said trigger means actuating the switching means to operate the motor when an input signal to the trigger means is above a predetermined value, said trigger means deactivating said switching means to prevent continued motor operation when the input signal to the trigger means is below a predetermined value,
    means for producing intermittent operation of said motor with the dwell period following each portion of motor operation being proportional to the current through the motor during the previous portion of operation, said means including a storage capacitor and a motor operated switch having a running position and a dwell position, said motor operated switch coupling said capacitor to said motor when in the running position so that the charge on said capacitor is representative of the current through the motor, said means also including means for dissipating the change on said capacitor at varying rates when said motor operated switch is in the dwell position,
    means for producing variable speed, continuous operation of the motor, said last mentioned means comprising a unijunction oscillator including a unijunction transistor and a capacitor coupled to the emitter of said unijunction transistor, and
    a manual switch for coupling said storage capacitor to said input means for intermittent operation and for coupling the emitter of the unijunction transistor to the input means for continuous operation.

9. The control system of claim 8 in which a single potentiometer varies the frequency of the oscillator and the discharge rate of the capacitor.

10. The control system of claim 8 comprising a potentiometer for varying manually the dwell period during intermittent operation and the motor speed during continous operation.

References Cited

UNITED STATES PATENTS 3,369,381  2/1968  Crane et al. _____ 318—332 X

ORIS L. RADER, Primary Examiner

R. J. HICKEY, Assistant Examiner